March 26, 1963   J. W. TWEEDY ETAL   3,083,310
ELECTRIC MOTOR HAVING A PERMANENT MAGNET STATOR
Filed March 11, 1960   2 Sheets-Sheet 1

INVENTORS
JAMES W. TWEEDY
EDWARD LATTA
BY
*Bayard H. Michael*
ATTORNEY

March 26, 1963   J. W. TWEEDY ETAL   3,083,310
ELECTRIC MOTOR HAVING A PERMANENT MAGNET STATOR
Filed March 11, 1960   2 Sheets-Sheet 2
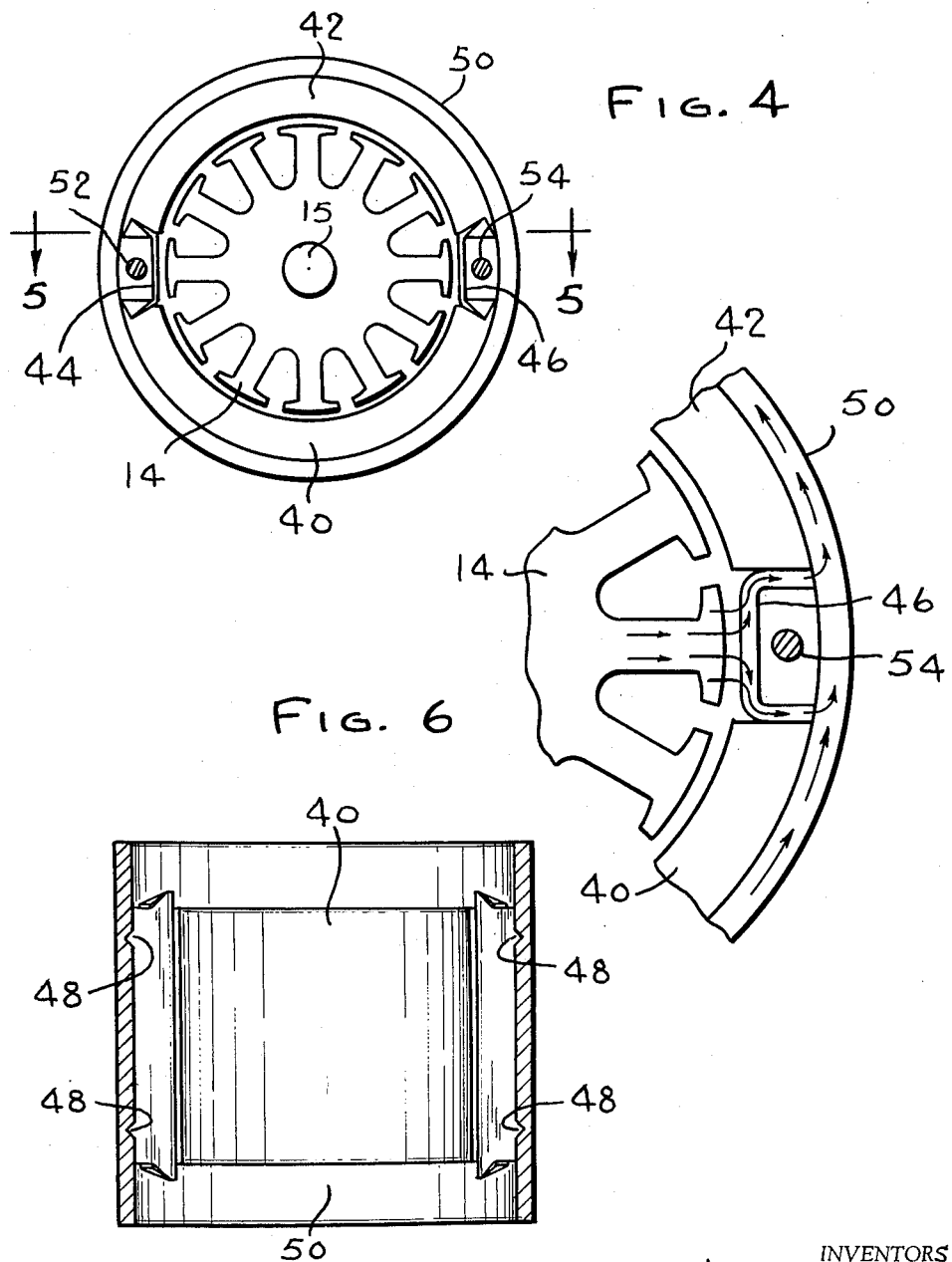
INVENTORS
JAMES W. TWEEDY
EDWARD LATTA
BY
ATTORNEY

United States Patent Office 3,083,310
Patented Mar. 26, 1963

3,083,310
ELECTRIC MOTOR HAVING A PERMANENT MAGNET STATOR
James W. Tweedy and Edward Latta, Owosso, Mich., assignors to Controls Company of America, Schiller Park, Ill., a corporation of Delaware
Filed Mar. 11, 1960, Ser. No. 14,221
6 Claims. (Cl. 310—154)

This invention relates to permanent magnet electric motors, and particularly to methods for reducing magnetic noise within the motors.

The introduction of ceramic permanent magnetic material for the stator of an electric motor has produced a new concept in motor design in which a number of problems has resulted. Ceramic magnets can be fabricated in relatively thin shells, the housing bolts are quite close to the armature. As a result, armature magnetic reaction causes a magnetic attraction to exist between the armature and the bolt; hence, every time an armature tooth approaches the bolt, there is a slight deflection of the bolt. Thus, the bolt vibrates at the tooth frequency causing what is called "magnetic noise."

The primary object of this invention is to eliminate magnetic noise in electric motors which utilize permanent ceramic magnets for the stator structure.

This result is accomplished by placing a wedge between the pole tips of the stator and securing the wedge to the housing. The wedge is made of a magnetic material so that it will act as a bridge across the ends of the pole tips to pass the magnetic flux across the pole tips thereby preventing any magnetic attraction from occurring between the armature and the mounting bolts. The magnetic attraction of the armature is now between the armature and the wedge, and the wedge is held securely in place. The armature attraction can be further reduced by making the wedge wide enough to bridge two of the armature slots, thus providing a more uniform air gap between the armature and the field structure. This eliminates any abrupt change that may occur in the magnetic circuit which is another cause of magnetic noise.

Other objects and advantages will be apparent from the specification and claims, as will obvious modifications of the drawings, in which:

FIG. 4 is a modified type of field structure.

FIG. 5 is taken on line 5—5 showing the wedge holding the stator in place.

FIG. 6 shows the magnetic field distribution through the wedge.

Figure 1:
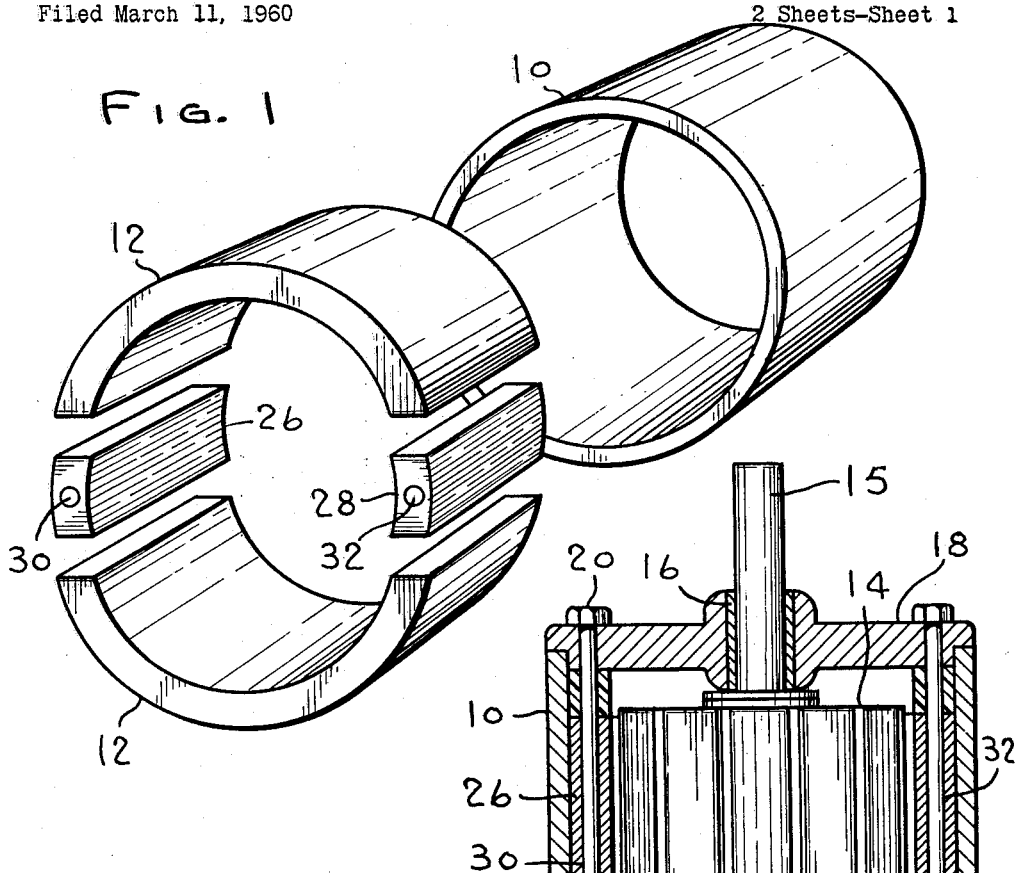
FIG. 1 is an exploded view of the field structure for an electric motor.

As shown in the drawings, the motor includes housing shell 10 in which stators 12, 12 are mounted. Armature 14 is secured to shaft 15 which is mounted to rotate in bearings 16 in the end members 18 of the housing. The entire assembly is held together by through bolts or mounting bolts 20 which pass through the stator.

The stator includes pole segments 22 and 24 made from permanent magnetic ceramic material such as "hard ferrite" which can be made in thin cylindrical sections. The stator segments are wedged into the housing by wedges 26 and 28 which are made from magnetic material such as powdered iron. Holes 30 and 32 are provided in the wedges to allow the mounting or through bolts to pass therethrough. By positioning the wedge between the pole segments it will act as a bridge across the ends of the pole segments to bypass the magnetic flux around the mounting bolts.

Figure 2:
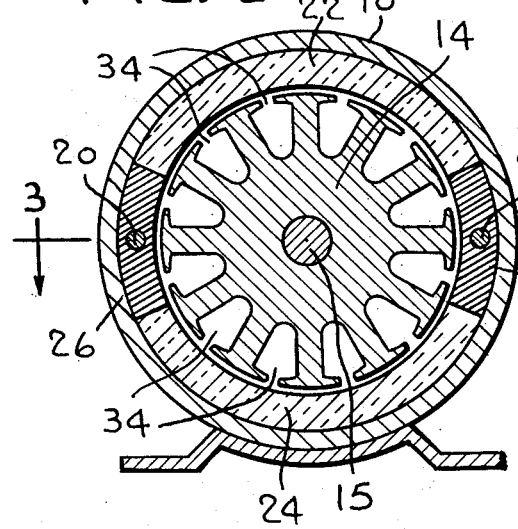
FIG. 2 is taken on line 2—2 of FIG. 3 showing the assembled motor.
Figure 3:
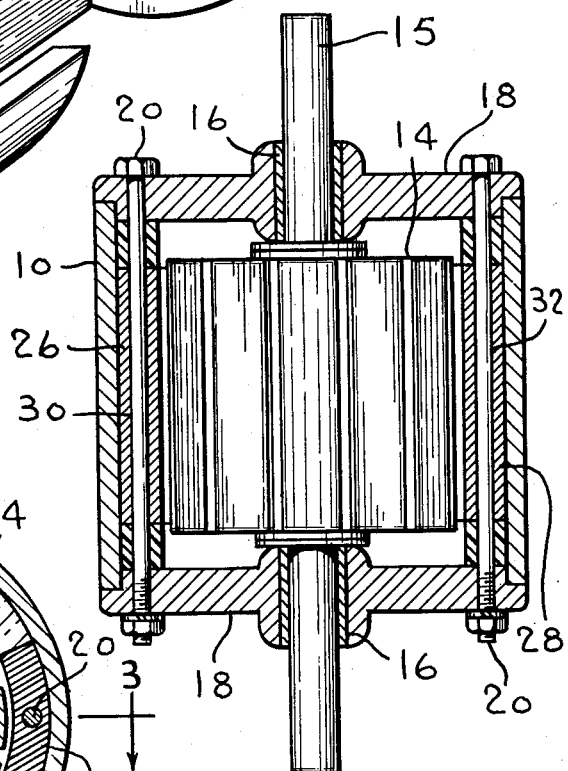
FIG. 3 is taken on line 3—3 of FIG. 2.

As shown in FIG. 2 the wedge is made wide enough to bridge at least two of the armature slots 34 in the armature. A more uniform air gap is then provided between the armature and the stator pole segments to thereby reduce the abrupt change in the magnetic circuit which is a cause of magnetic noise.

In FIGS. 4, 5 and 6 a modified type of wedge is shown which may be used to reduce magnetic noise as well as locating and holding the magnets in place. The stator is shown as including pole segments 40 and 42 which are held in position by inverted U-shaped wedges 44, 46 which are made of steel. The wedges are provided with projections 48 that are welded to housing 50. The pole segments are positioned in the housing and the ends of the wedges are flared to hold the segments axially. Mounting bolts 52, 54 may then be passed through the wedges to hold the end plates on the housing.

In operation when the armature is rotating, the flux lines from the armature will be collected by the wedge and will be passed through the wedges around the mounting bolts (FIG. 6). This will eliminate any magnetic attraction between the armature and the bolts, thereby preventing any magnetic noise from emanating from the bolts.

Although only two embodiments of the present invention have been shown and described, it will be apparent to those skilled in the art that various changes and modifications may be made therein without departing from the spirit of the invention or from the scope of the appended claims.

We claim:

1. In a dynamoelectric machine, a thin cylindrical housing, an armature positioned to rotate within said housing, said armature having a plurality of coil slots, a stator including a pair of pole segments and a pair of wedges forcing the pole segments against the cylindrical housing, and a pair of mounting bolts passing through the wedges to hold the stator from rotation, the bolts being magnetically shielded from the armature by the wedge.

2. A dynamoelectric machine according to claim 1 in which the wedges are made from a magnetic material to bridge the gap between the pole tips of the pole segments and are wide enough to bridge at least two coil slots in the armature to reduce the influence of the armature on the bolts and thereby prevent magnetic noise.

3. A dynamoelectric machine according to claim 2 in which the pole segments are composed of permanent magnetic ceramic material and the wedges are made from powdered iron.

4. In a dynamoelectric machine, a thin cylindrical housing, an armature positioned to rotate within said housing, said armature having a plurality of coil slots, a stator including a pair of permanent magnetic ceramic pole segments, a pair of U-shaped inverted wedges having the legs of the U secured to the housing to hold the pole segments in position, and mounting bolts passing through the wedges, said bolts being magnetically shielded by the wedges.

5. A dynamoelectric machine according to claim 4 wherein said wedges are flared at the ends to rigidly hold the pole segments from axial motion within the housing.

6. A dynamoelectric machine according to claim 5 wherein said wedges are made from a magnetic material to by-pass the magnetic flux of the armature around the mounting bolts.

References Cited in the file of this patent

UNITED STATES PATENTS 2,201,699    Myers _____ May 21, 1940
2,692,345    Wahlberg _____ Oct. 19, 1954